Nov. 22, 1966  P. H. STEVENS ET AL  3,287,520
FOOT-ACTUATED SWITCH ASSEMBLY
Filed April 5, 1965  2 Sheets-Sheet 1
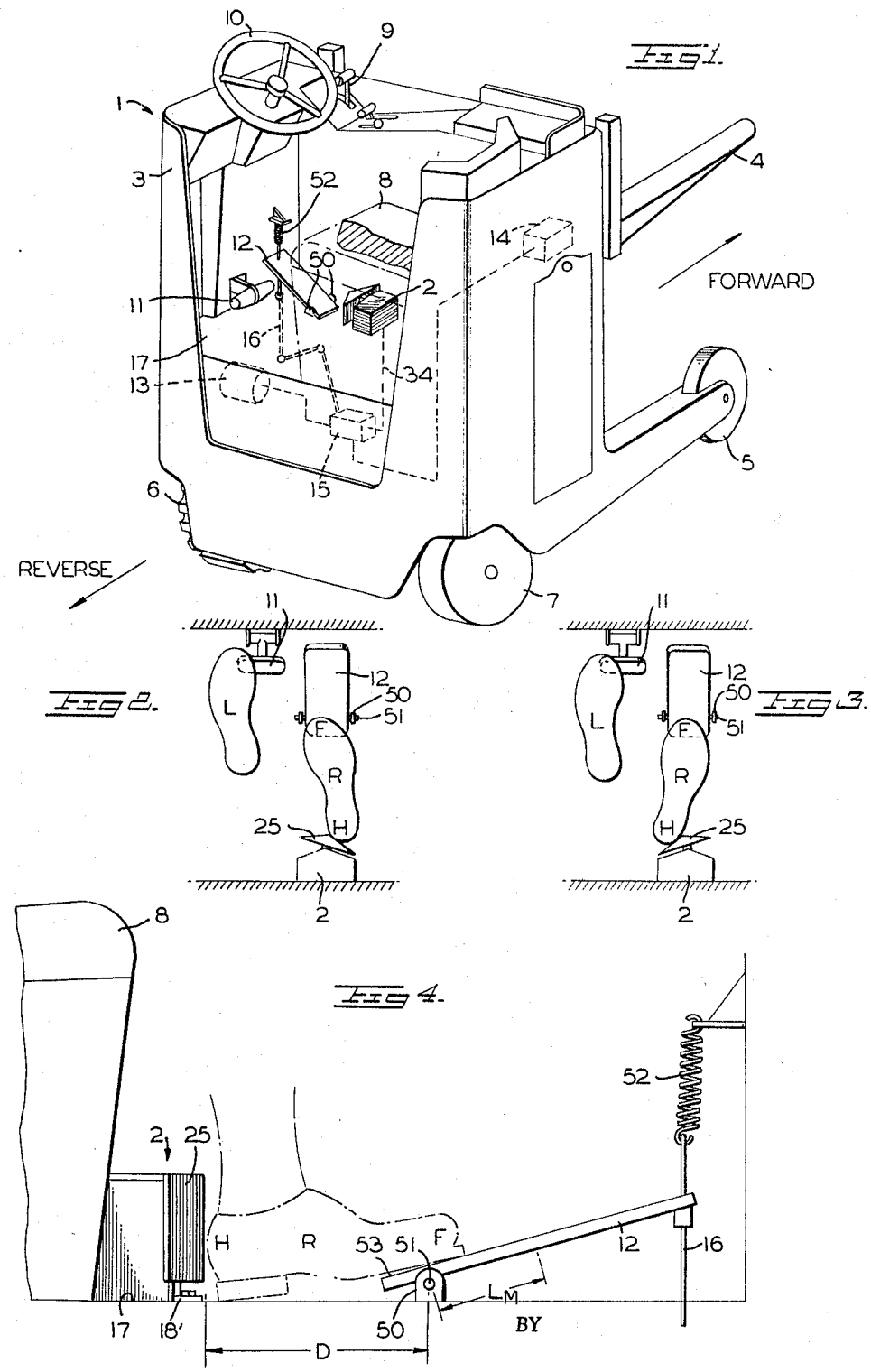

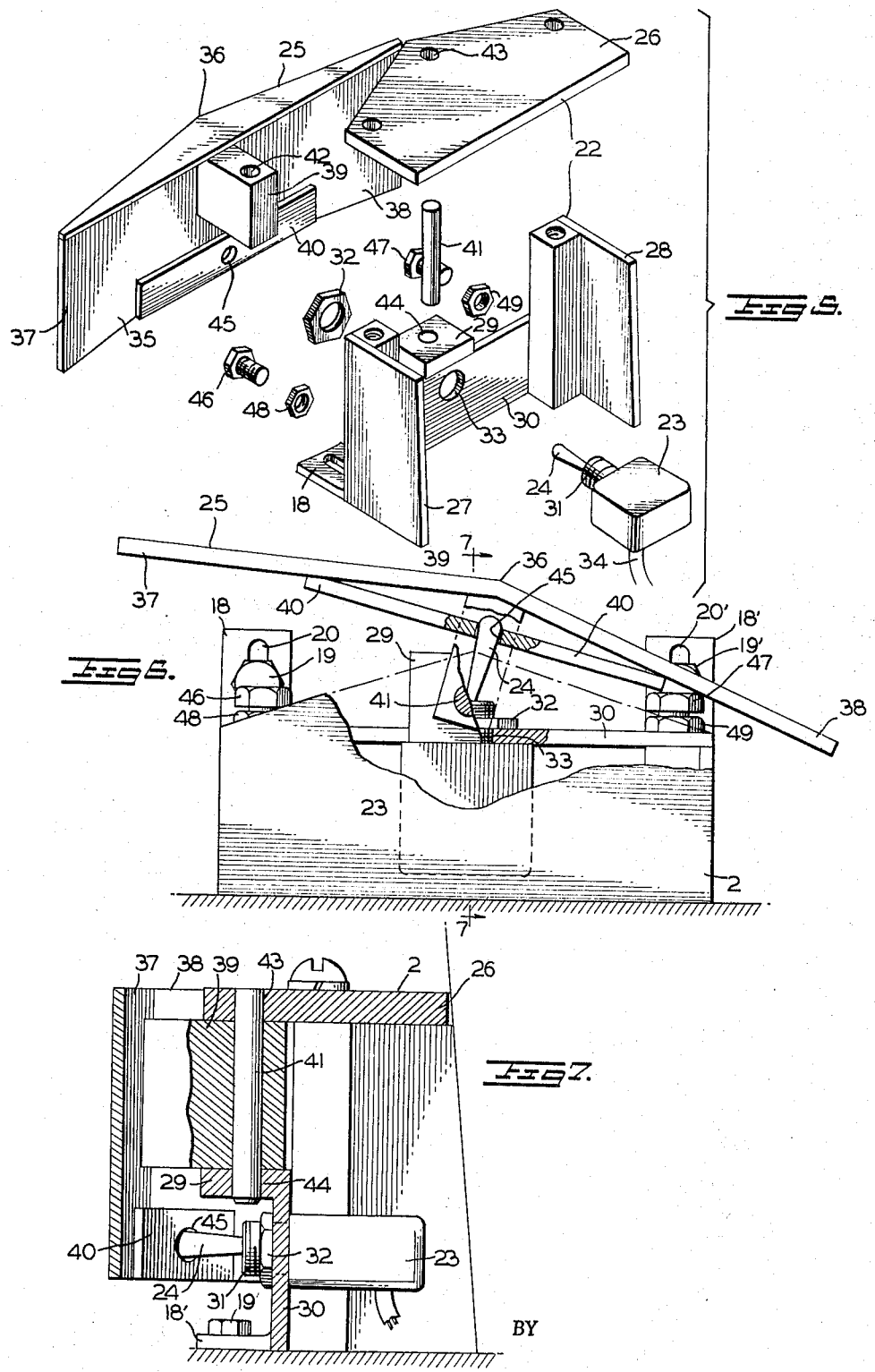

3,287,520
FOOT-ACTUATED SWITCH ASSEMBLY
Philip H. Stevens, Syracuse, David O. Chase, Camillus, and Alan W. Brownlie, Syracuse, N.Y., assignors to The Raymond Corporation, Greene, N.Y., a corporation of New York
Filed Apr. 5, 1965, Ser. No. 445,602
8 Claims. (Cl. 200—86.5)

The present invention relates to foot-operated controls for electrically-powered vehicles. More particularly, the invention relates to a heel-actuated switch assembly adapted to control the direction of travel of a vehicle, and the combination of such assembly with a vehicle accelerator pedal in such a manner as to prevent a vehicle operator from simultaneously operating both the accelerator pedal and the switch assembly.

In the field of electrical motor-powered vehicles, such as material handling trucks, it has been found desirable to provide means to prevent simultaneous operation of both a vehicle accelerating pedal or speed control and a vehicle direction reversing switch. Obviously, operation of a vehicle direction reversing switch without first releasing a vehicle speed control to decelerate or stop the vehicle, will result in a severe jolt which may cause dislodgement of the load carried by the vehicle, damage to the vehicle motor and transmission, or result in a vehicle operator being thrown from his seat on the vehicle and injured.

It heretofore has been proposed to prevent simultaneous operation of an accelerator pedal and a direction reversing switch by providing either mechanical or electrical interlock means between the accelerator and the switch, whereby movement of the latter is prevented when the accelerator control linkage is actuated. However, such interlocks tend to be both expensive and complicated. Moreover, such devices are not fail safe and a simple malfunction thereof sometimes may result in a serious accident.

It also has been proposed to provide, in combination, a pair of laterally spaced accelerator pedals, each controlling a different direction of vehicle travel, or to provide in a laterally spaced relationship to a conventional accelerator pedal, a directional switch similar to an automobile headlight dimmer switch. Although, these proposals insure vehicle deceleration between direction reversals, they have been found undesirable for use on material handling trucks where operators wish to maintain foot contact with a single accelerator pedal for quick and comfortable pedal manipulation; it being apparent that successive engagement and disengagement of laterally-disposed pedals or switches would tend to fatigue an operator of a truck experiencing possibly thousands of direction reversals each working day.

Further, it has been proposed to eliminate the fatiguing motion of laterally spaced speed and directional controls by providing a single pedal embodying both controls. In one prior art device a conventional accelerator pedal was supported on the floor of the vehicle and pivotably supported at one end about a first axis. Directional switching of the pedal was effected by permitting the pedal to be independently pivotable about a longitudinal axis disposed normal to the first pivot axis for selective depression of a pair of switches mounted beneath the pedal on either side thereof. A variation of such prior art single pedal arrangement comprises a single pivotably-supported pedal having one or more directional buttons projecting upwardly therethrough. An inherent disadvantage of each of these single pedal arrangements resides in the possibility that an operator either through error or design can actuate the directional control without decreasing the speed of the vehicle.

It is therefore an object of the present invention to overcome the disadvantages inherent in the prior art vehicle direction controls.

In the present invention there is provided a novel directional control switch assembly which is positioned with respect to a conventional accelerator pedal in such a manner as to insure effortless operation of the vehicle speed and directional controls, while preventing simultaneous operation thereof. Specifically, the directional switch assembly of the present invention is disposed behind of and in alignment with a conventional accelerator pedal and is adapted to be actuated by the heel of the operator's shoe. The desired spacing between the accelerator pedal and the switch assembly is adjustable to insure that when the heel of the operator is in operable engagement with the assembly, it is impossible for the operation to exert an actuating force upon the accelerator pedal, although the toe of the operator's shoe is maintained in engagement therewith.

Other features, objects, and advantages of the present invention will become apparent by reference to the following detailed description of the accompanying drawings, wherein, FIG. 1 is a perspective view of a material handling truck having parts removed to illustrate the installation of the preferred form of the present invention in such truck;

FIGS. 2 and 3 are schematic top views of the foot operator control of the present invention showing the relative positions of a brake pedal, accelerator pedal, and the vehicle direction-reversing switch assembly, the latter being shown in "forward" and "reverse" drive positions, respectively;

FIG. 4 is a schematic side elevation of the accelerator pedal and the vehicle direction reversing assembly, illustrated in FIGS. 2 and 3;

FIG. 5 is an exploded view of the switch assembly of the present invention;

FIG. 6 is a fragmentary top plan view of the assembly illustrated in FIG. 5; and FIG. 7 is a sectional view taken generally along lines 7—7 of FIG. 6.

FIG. 1 illustrates a material handling truck 1 on which the foot-operated switch assembly of the present invention, generally indicated as 2, is adapted to be installed. Truck 1 may be of any desired construction and includes a frame 3, a load handling means generally shown as 4, front supporting wheels 5, rear steerable wheels 6 and 7, and operator-supporting seat 8. Truck 1 may be provided with a plurality of conventional controls including a load-handling means control 9, steering wheel 10, foot-operated brake 11, and accelerator or vehicle speed control pedal 12.

Truck 1 is adapted to be propelled by an electric drive motor 13 acting through a suitable speed reduction gearing, not shown, and drive wheel 6. Power for motor 13 is supplied by a battery 14 which is connected to the motor through a motor control unit, diagrammatically shown as 15. Control unit 15 includes a motor direction-reversing means, not shown, which is controlled by foot-operated switch assembly 2, and a motor speed control means, not shown, which is controlled by accelerator pedal 12 acting through an accelerator linkage, generally shown as 16.

The motor directional reversing means may be of any desired construction, but preferably comprises a multi-pole solenoid relay for reversing the direction of current flow through the field coils of motor 13. The motor speed control means may also be of any desired construction, but preferably includes a plurality of sequentially-operated speed control switches having adjustable pneumatic delay devices for protecting the motor 13 against over-acceleration.

As generally illustrated in the drawings, the foot-operated switch assembly 2 is adapted to be disposed behind and in alignment with the accelerator pedal 12. From viewing FIGS. 2, 3 and 4, it is apparent that pedal 12 and switch 2 are adapted to be actuated by the fore F and heel H portions, respectively, of an operator's right foot R.

The switch 2 is adapted to be supported on cab floor plate 17 of truck 1 by means of slide brackets 18 and 18′, which are affixed to switch assembly 2, and threaded bolts 19 and 19′, which are adapted to pass through slot openings 20 and 20′ in brackets 18 and 18′ and be received within suitable tapped holes, not shown, provided in the cab floor plate 17. Brackets 18, 18′ and bolts 19, 19′ permit the switch assembly 2 to be selectively adjusted forwardly or rearwardly with respect to accelerator pedal 12 for the purpose hereinafter discussed.

Referring particularly to FIGS. 5, 6 and 7, switch assembly 2 comprises a housing 22 which is adapted to support a conventional toggle switch 23 having a spring-biased toggle shaft 24, and a toggle switch-actuating pedal 25. Housing 22 includes a top bearing plate 26, side plates 27 and 28, bottom bearing plate 29, and a front plate 30 to which slide brackets 18 and 18′ may be affixed by any suitable means, such as by welding.

Toggle switch 23 is provided with a threaded sleeve 31 and a locking nut 32 for the purpose of mounting switch 23 within aperture 33 of front plate 30. It will be apparent from the drawings that, when switch 23 is in mounted position, shaft 24 projects forwardly through aperture 33 in the direction of accelerator pedal 12 and is adapted to pivot between vehicle direction-reversing positions about a toggle axis disposed normal to cab floor plate 17.

It will be understood that toggle switch 23 is electrically connected by wires 34 to the motor directional-reversing means of motor control unit 15, whereby a pivoting of toggle shaft 24 between its respective directional-reversing positions acts to remotely control reversal of the direction of current flow to the field coils of motor 13.

Toggle switch-actuating pedal 25 comprises a generally V-shaped operator heel-engaging plate member 35 having an apex portion 36 and leg portions 37 and 38, a pivot block 39, and a toggle-shaft coupling plate 40. Pivot block 39 and coupling plate 40 are aligned with the apex portion 36 and affixed to the leg portions 37 and 38 of the plate 35 by any suitable means, such as by welding. Actuating pedal 25 is pivotably supported with respect to housing 22 for motion about a pivot axis disposed parallel to the toggle axis of shaft 24, by means of a pin 41 which is adapted to be journalled in bore hole 42 of pivot block 39 and be received within bearing openings 43, 44, of top and bottom bearing plates 26 and 29, respectively.

Referring particularly to FIGS. 6 and 7, it will be seen that coupling member 40 is provided with an oversized bore opening 45 adapted to loosely receive the free end of toggle shaft 24. It will be understood that bore 45 compels shaft 24 to follow the pivotable motion of pedal 25, its oversize allowing slight relative motion therebetween due to any non-coincidence of the pivot axes of pedal 25 and toggle shaft 24. While the pivot axes of pedal 25 and toggle shaft 24 have been shown as being relatively offset, it will be apparent that the structure of assembly 2 may be modified to make these axes coincident without departing from the practice of the present invention. Thus, the term parallel, as used in the claims, is meant to include switch assemblies having either an offset or coincident disposition of these axes.

As shown particularly in FIGS. 5 and 6, housing 22 is adapted to threadably receive stop bolts 46 and 47.

A pair of jam nuts 48 and 49 are provided to adjustably space the heads of stop bolts 46 and 47 a desired distance from the front surface of front plate 30. The heads of bolts 46 and 47 are adapted to engage the rearwardly-facing surfaces of leg portions 37 and 38, and thus act to control the extent of pivotable movement of pedal 25. Preferably, bolts 46 and 47 are adjusted to maintain the toggle shaft 24 biased slightly against its pivot spring, to present switch chatter when toggle bar 24 is in either of its directional-reversing positions.

As mentioned above, operator heel-engaging plate 35 is V-shaped. This design not only enables the switch assembly to be self indicating, but assures that when the switch is installed on a truck of the type illustrated in FIG. 1, leg portions 37 and 38 will be presented relatively normal to an operator's heel H when the operator partially turns to face the forward direction of vehicle travel (as generally illustrated in FIG. 2), or, alternatively, to face the reverse direction of vehicle travel (as generally illustrated in FIG. 3). This construction makes it difficult for an operator to kick or otherwise engage the wrong pedal leg portion when he turns to look where he is directing the truck.

Referring to FIG. 4, it will be seen that accelerator pedal 12 is adapted to be pivotably supported with respect to floor plate 17 by means of brackets 50 and pivot pin 51. Pedal 12 is normally biased to an inoperative position by any suitable means, such as coil spring 52, which is affixed to the free-swinging end of pedal 12. It will be apparent that the amount of torque applied by an operator about pivot axis 51 to depress the accelerator pedal 12 against the return bias of spring 52 will be a function of both the depressing force (foot force) exerted by the operator on the pedal and of the distance from the pedal pivot axis 51 to the point on the pedal 12 at which such force is applied.

Since the maximum foot force exertable varies between operators, it is useful to define a maximum foot force which no operator can exceed to establish a minimum occupied length $Lm$ below which no operator will be able to depress pedal 12 to energize motor 13. This invention employs the above concept to locate the switch assembly 2, or more precisely the apex portion 36 of operator heel-engaging plate 35, at a distance D from the accelerator pivot axis 51, which will compel an operator to retract his foot (R) beyond the minimum occupied length $Lm$, to permit spring 52 to return pedal 12 to an inoperable position, before the heel portion H of foot R can actuate switch assembly 2.

To standardize the pedal arrangement for all operators, a minimum occupied length must be determined for any particular accelerator pedal design. In the accelerator design, generally illustrated in FIG. 4, wherein accelerator pedal 12 is tilted upwardly at about a 30° angle with respect to the cab floor plate 17 and a five lb. return spring 52 is placed approximately 10 inches from pivot axis 51, it has been found that the minimum occupied length is approximately 5 inches, measured beyond pivot axis 51. This arrangement requires a 50 foot-pound starting torque to energize motor 13, which torque exceeds the maximum torque which any usual operator can exert with his foot in the position shown.

Since operator shoes vary in size, and since operators vary in strength, the distance D that will render an operator unable to apply release the minimum motor-starting torque from pedal 12 before engaging assembly 2 will vary between operators. Accordingly, distance D may be made adjustable for each operator by means of slotted brackets 18 and 18′, as described above. Thus, for a given shoe dimension, the switch assembly 2 may be located any distance D from pedal pivot axis 51 which falls between a maximum, where the fore portion F of the shoe R will lose contact with pedal 12, and a minimum, where shoe R occupies a sufficient length of pedal 12 to move it away from inoperative position against the bias of spring 52.

Alternatively, the distance D may be set for a universal shoe size by fixing the apex portion 36 of assembly 2 at about 9.6 inches from pivot axis 51 of the pedal illustrated in FIG. 4. Assuming a pedal overhang 53 of two inches rearwardly of the pivot axis 51, this universal distance will accommodate approximately 98% of the U.S. males. If pedal overhang is extended between 1 or 2 inches, over 99% of U.S. males could be accommodated.

Thus, the distance D can be adjustably set to accommodate a given set of shoe lengths in such a manner that when the heel portion of an operator's shoe operatively engages the leg portions 37 or 38 of the pedal 25, the longest shoe of the strongest man will not occupy the minimum length of pedal 12 required to energize motor 13, while the smallest shoe will not lose contact with the accelerator pedal 12 during actuation of pedal 25.

It will be recognized by those skilled in the art that the present invention does not only prevent simultaneous operation of a vehicle directional switch and an accelerating pedal, but also provides a convenient directional switch which may be actuated by smooth continuous reaction of an operator's foot.

While the form of apparatus herein described constitutes a preferred embodiment of the invention, it is to be understood that this invention is not limited to this precise form and that changes may be made therein without departing from the scope of the invention which is defined in the appended claims.

What is claimed is:

1. In a vehicle having electrically-powered motive means, the combination of an accelerator pedal operatively connected to control said motive means by depression of said pedal to vary the speed of said vehicle, said pedal mounted to rotate about a pivot axis upon depression and require at least a predetermined torque applied to said pedal about said axis by a fore portion of one foot of a vehicle operator to effect depression of said pedal; and a directional pedal assembly operatively connected to control said motive means to vary the direction of travel of said vehicle, said assembly disposed behind and in alignment with said accelerator pedal and located to be operated by the heel portion of said foot, said assembly spaced from said axis a distance sufficient to prevent said operator from applying said predetermined torque to said accelerator pedal with said fore portion when said heel portion is in operable engagement with said assembly.

2. The combination recited in claim 1, wherein said assembly comprises: a toggle switch having a spring-biased shaft pivotable between two mutually-opposite vehicle direction-reversing positions; mounting means supporting said switch for pivotable movement of said shaft about a prescribed toggle axis; an actuating pedal operably connected to said shaft and supported by said mounting means for pivotable movement about an axis disposed parallel to said toggle axis, said actuating pedal operable by said heel portion to effect pivotable between said direction-reversing positions motion of said shaft.

3. The combination recited in claim 2, wherein means are provided to adjustably position said mounting means with respect to the pivot axis of said accelerator pedal.

4. In a vehicle having propulsion motor means, the combination of: an accelerator pedal adapted to be depressed by a fore portion of a foot of an operator and operatively connected to control the speed of said vehicle by depression of said pedal, said pedal pivotally mounted to rotate about a first axis upon depression and spring-biased to require at least a predetermined torque to be applied to said pedal to depress said pedal;

and a directional control pedal operatively connected to control the direction of rotation of said motor means between forward and reverse vehicle-travel positions, said directional control pedal spaced behind said accelerator pedal for operation by the heel of said foot of said operator, but spaced from said axis a distance sufficient to prevent simultaneous depression of said accelerator pedal and operation of said directional control pedal by said foot of said operator.

5. A heel-actuated switch assembly supported on a vehicle in a prescribed relationship to a vehicle accelerating pedal and operatively connected to control reversal of the direction of travel of said vehicle, which assembly comprises: a toggle switch having a spring-biased shaft pivotable between two mutually-opposite vehicle direction-reversing positions; mounting means supporting said switch to provide pivotable movement of said shaft about a prescribed toggle axis; and an actuating pedal operably connected to said shaft and supported by said mounting means for pivotable movement about an axis disposed parallel to said toggle axis, said actuating pedal operable by a heel portion of one foot of an operator to effect said pivotable direction-reversing motion of said shaft.

6. The switch assembly of claim 5 wherein said actuating pedal comprises: a generally V-shaped plate member having an apex portion projecting towards said accelerator pedal and a pair of leg portions which extend outwardly and rearwardly with respect to said accelerator pedal; and a coupling member affixed to said plate member and disposed centrally of said apex portion, said coupling member located to slidably engage the free swinging end of said shaft to affect pivotable movement of said shaft in response to pivotable movement of said plate.

7. The switch assembly of claim 6, wherein said mounting means is provided with adjustable pedal-motion limit means engageable with said leg portions.

8. The switch assembly of claim 5, wherein means are provided to adjustably position said assembly with respect to said accelerating pedal.

No references cited.

ROBERT K. SCHAEFER, *Primary Examiner.*

H. O. JONES, *Assistant Examiner.*